United States Patent [19]

Pellegrino et al.

[11] Patent Number: 4,675,590

[45] Date of Patent: Jun. 23, 1987

[54] STEPPING MOTOR DRIVER WITH MID-FREQUENCY STABILITY CONTROL

[75] Inventors: John Pellegrino, Quincy; Simyon Palmin, Sharon, both of Mass.

[73] Assignee: Sigma Instruments, Inc., Braintree, Mass.

[21] Appl. No.: 737,235

[22] Filed: May 23, 1985

[51] Int. Cl.[4] .............................................. H02P 8/00
[52] U.S. Cl. .................................... 318/696; 318/685
[58] Field of Search ............................... 318/685, 696

[56] References Cited

U.S. PATENT DOCUMENTS 4,455,520 6/1984 Ward et al. ........................ 318/696
4,540,928 9/1985 Marhoefer ........................ 318/696

Primary Examiner—William M. Shoop, Jr.
Assistant Examiner—Saul M. Bergmann
Attorney, Agent, or Firm—Leo Stanger

[57] ABSTRACT

In the disclosed stepping motor system a band pass filter extracts error signals from currents in a stepping motor driver, and a feedback system delays command pulses to the driver on the basis of the error signals. This suppresses mid-frequency instabilities in the operation of the stepping motor.

20 Claims, 3 Drawing Figures

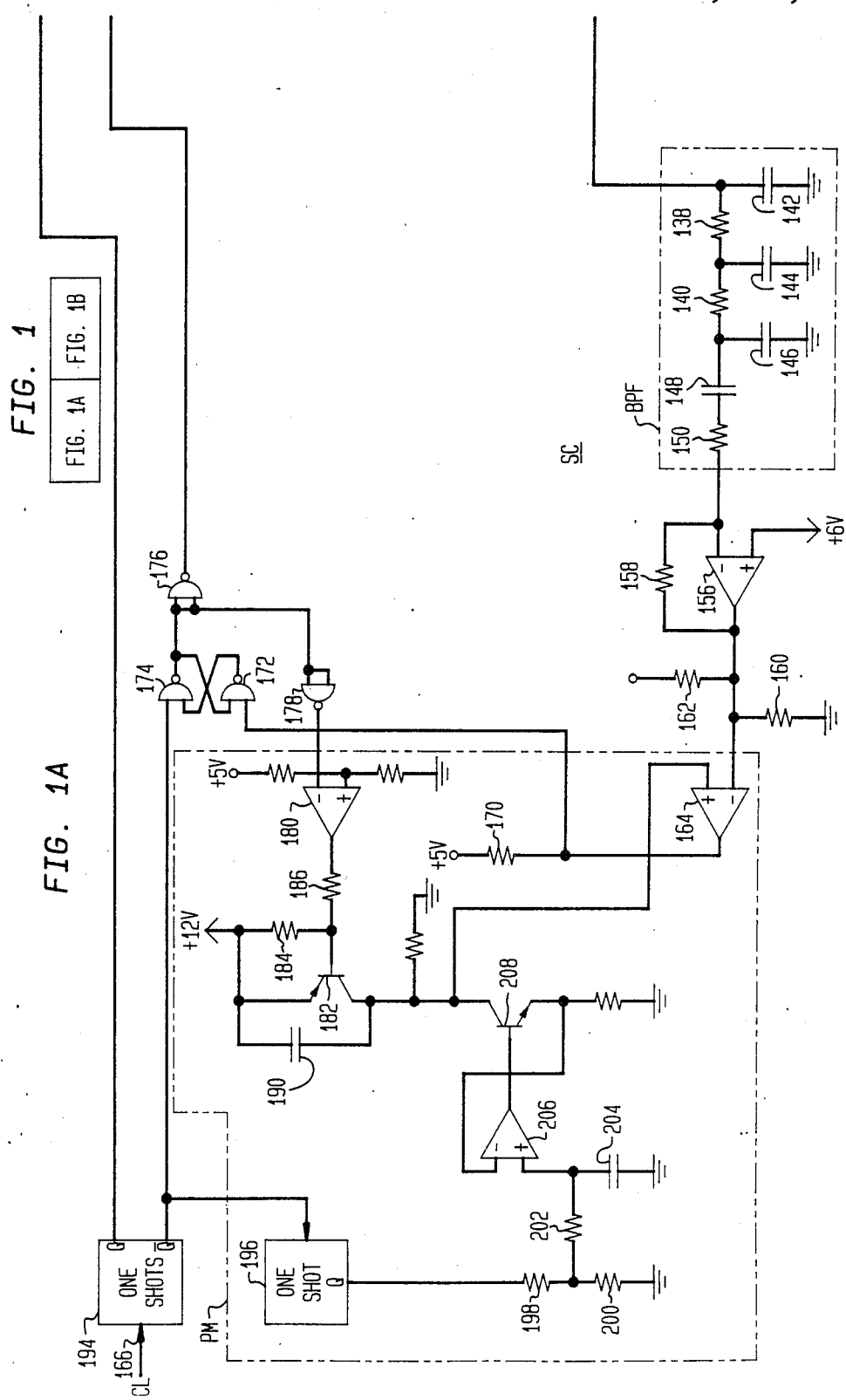

TYPICAL STEP MOTOR
SPEED PROFILE

STEPPING MOTOR DRIVER WITH MID-FREQUENCY STABILITY CONTROL

BACKGROUND OF THE INVENTION

Field of the Invention

This invention relates to stepping motor systems, particularly to stepping motor drivers, and more particularly to driver compensator circuits that permit the driver to inhibit the rotor instability that occurs when the driver applies pulses to a stepping motor over a range of mid-frequencies, such as from 300 to 40,000 steps/sec.

Stepping motor systems, and their operation, are well known. Typically, a motor driver responds to a stream of command pulses and applies step pulses to coils on the motor's stator. A number of circumferentially-distributed inwardly-extending stator teeth magnetically drive circumferentially-distributed outwardly-extending teeth on the motor's coaxial rotor. Each driver pulse steps the rotor relative to the stator so that the pulse frequency, at least partially, establishes the motor speed. The motor speed corresponding to the pulse frequency of the input command pulses is referred to as the input command pulse speed.

Mid-frequency stepping motor speed instability, or reduction of velocity damping, is a condition which is inherent in any conventional stepping motor system, and is due to the influence of the internally generated motor back-EMF on the motor current. It causes destabilizing side band components to oscillate the rotor about the input commanded speed. A variety of active feedback techniques have been employed in the past to control mid-frequency instability. Each of these prior techniques involved significant added driver complexity, and imposed undesirable performance limitations.

An object of the invention is to improve stepping motor systems, and/or drives.

Another object of the invention is to provide a stepping motor drive, or compensator circuit for a drive, that inhibits mid-frequency instability.

Still another object of the invention is to overcome the limitations of prior stepping motor systems and drivers.

SUMMARY OF THE INVENTION

According to a feature of the invention, these objects are attained, in whole or in part, by sensing error signals arising from motor speed oscillations about the desired input command pulse speed, and feeding the signal back to compensate for such oscillations.

According to another feature of the invention, the error signal is fed back to change the input or command pulse phase angles.

These and other features of the invention are pointed out in the claims. Other objects and advantages of the invention will evident from the following detailed description when read in light of the appended drawings.

BRIEF DESCRIPTION OF THE DRAWINGS

FIGS. 1A and 1B together represent a schematic diagram of a system embodying the invention.

DESCRIPTION OF PREFERRED EMBODIMENT

Figure 1B:
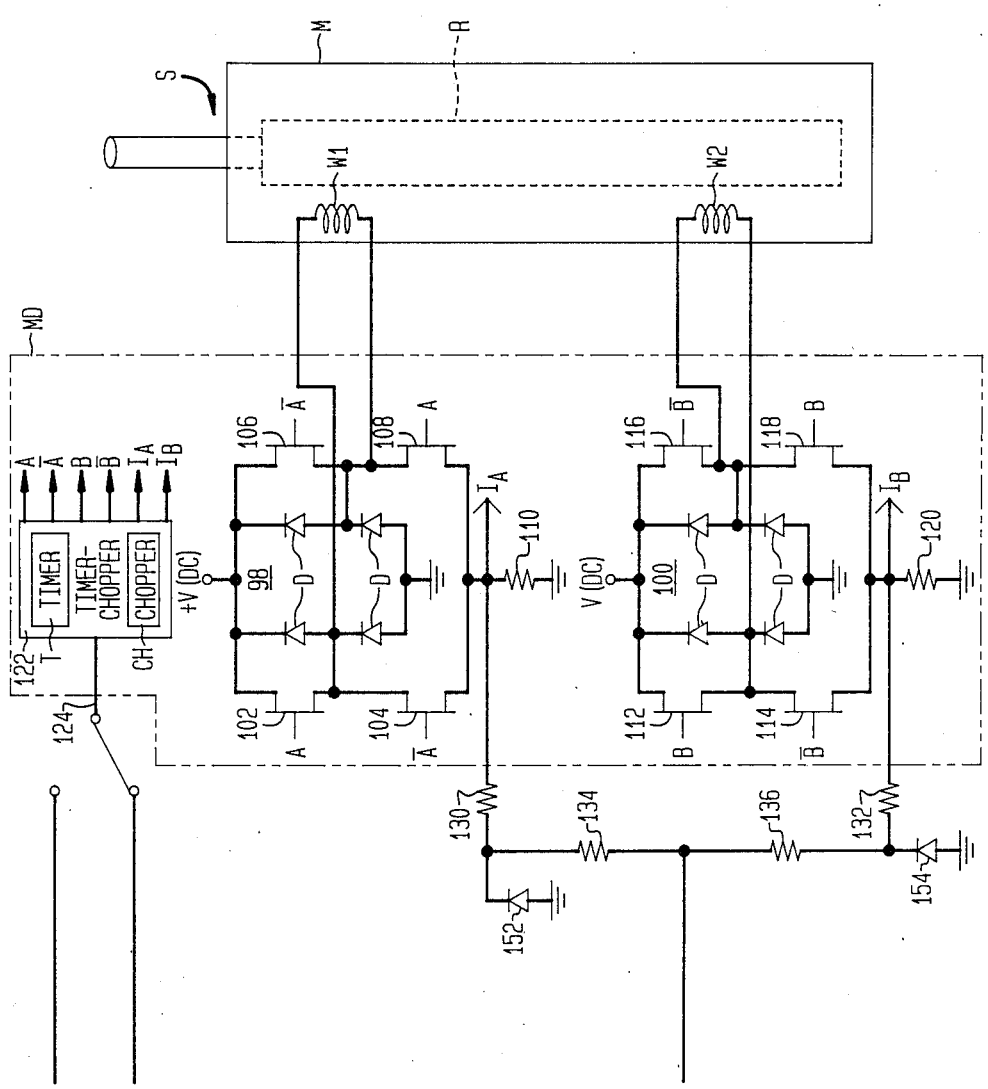

In FIGS. 1A and 1B, a motor drive MD receives command pulses on a command line CL from a source not shown and drives a conventional stepping motor M. The motor M shown is a standard two phase stepping motor with a set of stator windings W1 of the first phase P1 and a set of stator winding W2 of the second phase P2, which sets, when suitably energized with pulses step the motor's rotor R relative to the stator to drive a shaft S connected to the rotor. Motors and drives of this type are disclosed in U.S. Pat. Nos. 4,255,696 and 3,560,821.

Typically in such motors a current pulse passes through the windings W1 to step the rotor R in one direction a fractional tooth pitch, and hence, realigns the rotor teeth relative to the teeth on the stator. A succeeding current pulse in windings W2 steps the rotor R another fractional tooth pitch. The teeth are now aligned so a subsequent reverse pulse in windings W1 steps the motor another fractional tooth pitch in the same direction. Similarly, the next reverse pulse in winding W2 steps the motor yet another fractional tooth pitch in the same direction. Hence, continuing reversal of currents through the windings W1 and W2 step the rotor R and the shaft S in the same rotary direction.

Two driver sections 98 and 100, apply the +V(DC) voltage to the windings W1 and W2 of phase P1 and phase P2. In the section 98, a bridge is composed of FET 102, 104, 106, and 108 which operate as respective switches. The bridge, formed by FETs 102, 104, 106, and 108, energizes the windings W1 of phase P1 in one direction when the voltages A turn on the gates of FETs 102 and 108, and the voltages $\overline{A}$ turn off the gate of FETs 104 and 106. The current direction through the coils of phase P1 reverses when the voltages A and $\overline{A}$ are reversed. A resistor 110 in the ground path of the transistors 102, 104, 106, and 108 senses the currents through the phase P1.

FETs 112, 114, 116, and 118, which operates as switches, in the driver portion 100 form a second bridge. Ninety degrees out of phase with the voltages A and $\overline{A}$, voltages B and $\overline{B}$ pass current through the winding W2 of phase P2 in one direction when the voltages B turn on the FETs 112 and 118, and the voltages $\overline{B}$ turn off the FETs 114 and 116. The current reverses in windings W2 of phase 2 when the voltages B and $\overline{B}$ are reversed. A resistor 120 in the ground path senses the currents through the windings W2 of phase P2.

A timer-chopper 122 forms pulse shaped voltages A, $\overline{A}$, B, and $\overline{B}$ in response to step pulses which appear at a line 124 and whose pulse frequencies and phases determine the frequencies and phases of the voltages A, $\overline{A}$, B, and $\overline{B}$. In the timer-chopper 122, a timer T establishes 180° phase differences between voltages A and $\overline{A}$ and between voltages B and $\overline{B}$. The timer also establishes 90° phase differences between voltages A and B and between voltages $\overline{A}$ and $\overline{B}$. In the timer-chopper 122, a chopper CH responds to signals $I_A$ and $I_B$ which represents winding currents to chop, i.e. interrupt, individual pulse voltages A, $\overline{A}$, B, and $\overline{B}$ so as to control the ultimate currents through the windings W1 and W2. Timer-chopper 122 and the driver portions 98 and 100 form a conventional stepping motor drive MD. Such drives are well known and described, for example, in detail in U.S. Pat. Nos. 4,255,696 and 3,560,821.

As stated, the chopper CH in timer-chopper 122 receives the voltages appearing across the resistors 110 and 120. These voltages constitute current signals $I_A$ and $I_B$ which represent the average currents through the respective windings W1 and W2. The chopper of timer-chopper 122 responds to these current signals $I_A$ and $I_B$ to vary the total ON times of the voltages A, $\overline{A}$, B, $\overline{B}$ from the timer in timer-chopper 122 so as to vary the total conduction times of the FET switches 102-108 and 112-118. In this way the currents applied to the windings W1 and W2 remain within predetermined values. That is, the current signal $I_A$ and $I_B$ are feed into the timer-chopper 122 in order to regulate the current at a constant value. Regulation is achieved by modulation of the FET switch conduction times. This type of control also is known and appears, for example, in the aforementioned U.S. patents.

Figure 2:
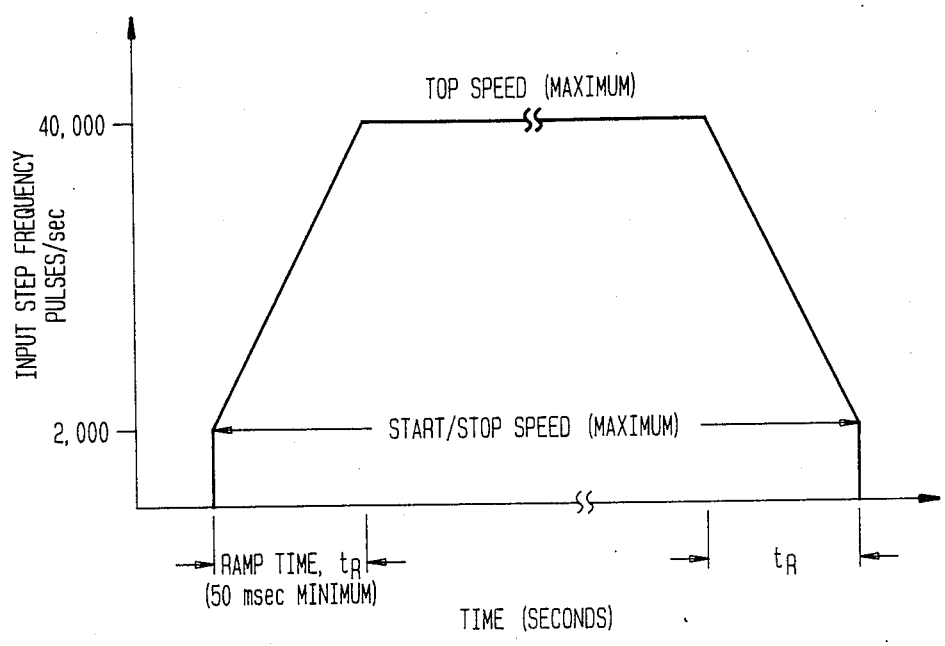
FIG. 2 is a graph illustrating a typical stepping motor speed profile.

The rotational distance through which the motor M is to move a load determines the number of pulses needed on the line 124 for the drive MD. This is so because each pulse rotates the rotor of the motor M a specific distance. On the other hand, the top speed of the motor M, or the desired top speed of the load turned by the motor, determines the frequency of the pulses which must appear at the line 124 of driver D. However, the inertia of the motor M and the load limit the initial motor speed, and hence, the initial input frequency of pulses 124. The inertia also restricts the deceleration of the motor, and hence, the pulse frequency when the load approaches it final destination. A typical time-frequency or speed profile for a stepping motor appears in FIG. 2. Here, the input step frequency starts at 500 pulses per second and increases linearly through a ramp time of a minimum of 50 milliseconds to a top frequency of 40,000 pulses per second that establish a top speed. When the load approaches its final destination, the input stepping frequency is ramped down over a time $t_R$ to 2,000 pulses per second.

It has been discovered that, at mid-frequencies of 0.3k to 20k pulses per second the motor inductance and back-EMF produce destabilizing rotational velocity components in the motor. The present invention avoids the destabilizing side-band frequency components that the motor back-EMF may cause at mid-frequencies in the frequency range of FIG. 2.

A resistor network 130, 132, and 136 applies the positive going voltages appearing across the resistors 110 and 120 to a band pass filter BPF composed of series resistors 138 and 140, three shunting capacitors 142 to 144, and 146, a series capacitor 148 and a series resistor 150. A pair of diodes 152 and 154 shunt negative signals appearing across the resistors 110 and 120 to ground. The pass filter has a low frequency cut-off of 10 radians per second and a high frequency cut-off of 1000 radians per second.

A single stage amplifier 156 with a feedback resistor 158 amplifies the output of the band pass filter BPF with a gain of 50. The amplifier 156 is biased with a +6 volt source to cause signals to vary about that level. The band pass filter BPF and the amplifier 156 form a differential velocity detector which extracts differential velocity information from the total information appearing across the resistors 110 and 120. The differential velocity information is a function of the difference frequencies between the frequency $F_{IN}$ the pulse signals on the line 124 into the drive MD and the frequency FR of the rotor. This constitutes the rotor's error velocity that appears as mid-frequency instability.

A pair of equal resistors 160 and 162 limits the swing at the output of the amplifier 156. This output appears at an inverting input of a comparator 164 whose other input is a descending ramp. The voltage there is repeatedly generated on the basis of input pulses from an external step command line 166. When the descending ramp at the non-inverting input of the comparator 166 falls below the error voltage at the inverting input, the output of the comparator 164 switches from high to low. Hence, a lower error voltage from high to low later in the phase of the declining ramp. A high error voltage produces a switch in an early part of the phase and a low error velocity produces a late switch. Change from high to low reverses the high which a biasing resistor 170 and a positive voltage apply to a flip-flop composed of NAND gates 172 and 174. The low then reverses the high which the NAND gate 174 had applied to an inverter 176. That is, the NAND gate 174 now goes low and the inverter 176 goes high. The output of the inverter 176 represents the pulses appearing at the line 124 to the motor drive MD. A second inverter 178 also inverts the low at the output of the NAND gate 174 and produces a high at the inverting input of an amplifier 180. Its low output turns on a PNP transistor 182 through a high biasing network composed of resistors 184 and 186 connected to a 12 volt source. The low output of amplifier 180 causes conduction in the transistor 182 which discharges a ramping capacitor 190. This restarts the ramp and substantially places the 12 volt potential at the non-inverting input of the comparator 164.

The discharge continues until another pulse appears at the line 166. Such a pulse produces a high at the output Q of a pulse shaping monostable multivibrator or one-shot 194 and a low at the output $\overline{Q}$. This sets the flip-flop 172, 174, and removes the low voltage at the emitter of the transistor 182 shunting the capacitor 190. At the same time, the low at the output $\overline{Q}$ of the monostable multivibrator 194 pulses a pulse shaping monostable multivibrator or one-shot 196 whose Q output feeds an integrating circuit composed of resistors 198, 200, 202, and capacitor 204, that generate a voltages proportional to the frequency of the input pulses. Amplifier 206 forms a frequency dependent current source with a transistor 208 and an emitter resistor 210. The capacitor 190 now charges with current at a frequency dependent rate. Its lower plate voltage drops to form the descending ramp at the non-inverting input of the comparator 164.

In operation, an external step command source applies pulse signals to the input terminal 166 for the purpose of stepping the motor. The monostable multivibrator 194 sets the flip-flop 172, 174. The latter delays the pulses emerging at the inverter 176 for a variable period of time dependent upon the error velocity. The inverter 176 then applies the variably delayed pulses to the control logic 122 at the input terminal 124. The control logic 122 controls the transistors 102 to 108 of the bridge 98 as well as the transistors 112 to 118 of the bridge 100 to step the motor. The current sampling resistors 110 and 120 produce voltages which have a number of different frequencies, components, namely, a DC voltage $V_1$, that is, the by-product of the rectification action of the switching circuit, a voltage $V_2$ at the repetition frequency $F_{IN}$ of pulse delivered to the driver MD, and two-side band back-EMF voltages $V_{EMF}$. One of the two side-band frequencies is the sum of the frequency $F_{IN}$ and the frequency $F_{ROTOR}$ of the rotor R, and the other is the frequency $F_{IN}$ minus the frequency of the rotor $F_{ROTOR}$. The total voltage $$V_{TOTAL} = V_1(DC) + V_2(F_{IN}) + V_{EMF}(F_{IN} + F_{ROTOR}) + V_{EMF}(F_{IN} - F_{ROTOR})$$

The last term of this equation is a value $\Delta V$ which represents the error velocity information $\Delta F$, namely, the departure of the rotor frequency $F_{ROTOR}$ from the pulse input frequency $F_{IN}$. The three terms constitute unwanted frequency information. The band pass filter BPF and the amplifier extracts the error velocity information $\Delta F$ and rejects of the unwanted frequency terms. The single stage amplifier 156 has a gain of 50 preceded by the band pass filter BPF with a low frequency cut-off at 10 radians per second and an upper frequency cut-off at 1,000 radians per second. The low-frequency characteristics of the filter are determined mainly by the values of capacitor 148 and resistor 150 and the high frequency characteristics are determined mainly by the resistor 140 and capacitor 146. The resistor 160 and 162 limit the modulation control to approximately $\pi/3$ radians or 60°. The output of the error sensing circuit at the output of the amplifier 156 is applied to the phase-angle modulation control point, the inverting input, in the voltage comparator 164.

The variably delayed (modulated) pulses from the inverter 176 delay the pulses to the control logic 122 which in turn advances or retards the switching or the winding voltage in windings W1 and W2 in order to force the rotor velocity back into frequency correspondence with the input step commands at terminal 166.

The circuitry outside the conventional motor drive MD constitutes the frequency adaptive phase angle modulator PM of the invention. The external pulse input appears at the terminal 166, the output phase delayed signal is generated at the output of the NAND gate 176 and appears on the line 124, and the modulation control point is at the non-inverting input of the comparator 164 which is connected to the velocity error sensing circuit.

The external input pulse at the terminal 166 and applied to the pulse shaping monostable multivibrator 194 triggers the operation of the phase angle modulator circuit. The $\overline{Q}$ output of the monostable multivibrator 194 sets the flip-flop composed of AND gates 172 and 174, and this forces the output of inverter 176 low. The $\overline{Q}$ output of the multivibrator 194 also triggers one-shot 196 which is a precision 20 microsecond pulse generator. The voltage averaging filter composed of resistors 198 and 202, as well as capacitors 202 and 204 filters the output of the pulse generator 196, and produces a voltage proportional to the input frequency which is used to control the linear charging rate of a capacitor 190. The phase angle is controlled by comparing the voltage developed across the capacitor 190 and appearing at the non-inverting input of the comparator 164 with the error voltage appearing at the inverting input of the comparator 164.

The output of the comparator 164 resets the flip-flop 172, 174 to low, and the output of the inverter 176 back to the original high state. This appears at the output to the line 124. The time period during which output signal of the inverter 176 and on the line 124 is low determines the phase shift of the circuit. The changes in error voltages applied to the inverting input of the comparator 164 by the amplifier 156 modulates the phase shift. Because the resistors 160 and 162 have equal values of 10 K and form a voltage divider across a 12 volt source, the nominal voltage at the control point, i.e., the inverting input of the amplifier 164, is 6 volts. The control voltage range at this inverting input of the comparator 164 is limited to plus or minus 2 volts about the nominal value, so as to result in a limit of ±33% modulation control.

The present invention uses an error sensing signal circuit SC (BPF and 156) which extracts velocity oscillation information from the power switching circuit in order to achieve well damped velocity stabilization of a stepping motor operated in the mid-frequency region. The system can be used without the stability control. In such a case, line 124 is directly connected to the output Q of the pulse generator 194, rather than to the output of the inverter 176. This eliminates the effect of a mid-frequency control circuit.

At low frequency or frequencies below mid-range, the motor torque is maintained synchronous with the input step frequency by the current regulation or chopping which occurs between steps. The present invention avoids the problem which occurs at mid-frequencies when the current regulation of the driver cannot be maintained due to insufficient power supply voltage across the power switch needed to overcome motor inductance and in the induced EMF in the motor windings. The invention provides an adaptive mid-frequency feedback loop to maintain torque synchronism and avoid velocity oscillations over a wide range of operating input frequencies (300 to 40,000 pulse/sec.) without adjustment or loss of control. The invention is operative over the low as well as medium frequency range, such as over the range zero to 40,000 pulses/sec.

The invention utilizes the fact that the motor torque is proportional to the sine of the torque angle in order to maintain speed control at mid-frequency. The invention senses both velocity errors, amplifies the error, and feeds the signal back to phase modulate the input pulse train. The resulting modulation of the input phase angle varies the torque angle which speeds up or slows down the rotor velocity in order to force the rotor back into synchronism with the input command speed.

The stabilization technique of the invention requires no external velocity, position, or power sensing signal in order to develop the necessary feedback signals to stabilize the motor speed. The invention takes advantage of the duality of the existing power switching network across each motor winding to be both a synchronous power modulator, its primary purpose, and a synchronous detector of any side band frequencies present in the motor back EMF voltage, due to rotor velocity oscillation about the desired synchronous speed. The circuit recovers the value $\Delta F = (F_{IN} - F_{ROTOR})$, which is the error signal from the current sense resistors 110 and 120 in the switch circuit to provide negative torque feedback in order to reduce the $\Delta F$ oscillation toward zero.

The stabilizing control technique uses motor torque angle modulation in order to eliminate a unwanted $\Delta F$ or error frequencies at the rotor. Modulation of the torque angle is achieved by appropriately delaying or advancing the phase angle of the input step command as a function of the $\Delta F$ velocity signal. The system is pulse triggered by the external input step command, has fast response time so as it will not drop or miss any command pulses during slewing modes, and is adaptive to the frequency so it will accommodate the complete range of motor operating frequencies from zero to 40,000 steps per second without any component changes or adjustments.

The fast response of the stabilization circuit does not impose any high speed performance limitations to the driver.

The system can be adapted to any conventional driver configuration (bipolar, unipolar, resistive, or chopper current regulated) by interposing the stability control circuit between the external step input command and the step input to the drivers translator-control logic.

Simplicity, small-size, and low cost allow for practical, cost-effective installation into many applications previously not feasible with prior stabilization techniques. The circuit implementation can use four standard integrated circuit chips and a small amount of low-cost support discrete components. The circuit can be packaged into a printed circuit board less than six square inches, or into a custom integrated circuit of less than 0.5 square inches.

It should be noted that freewheeling diodes D pass currents when the field around the windings W1 or W2 collapses.

While embodiments of the invention have been described in detail, it will be obvious to those skilled in the art that the invention may be embodied otherwise without departing from its spirit and scope.

What is claimed is:

1. A motor control system, responsive to external pulses, comprising:
    a driver having an input and for producing current in the motor in response to pulses applied to the input, and for producing electrical values in response to currents applied to the motor;
    a band pass filter;
    a frequency adaptive phase controller; and
    circuit means connecting said filter to said driver for extracting signals over a predetermined frequency range from the electrical values and connecting said phase controller to the input and the filter so that said phase controller varies the phases of pulses applied to the driver in response to the filter;
    said phase controller being a phase angle modulator having an output whose phase angle varies with the signals extracted from the filter independent of frequency.

2. A system as in claim 1, wherein the electrical values represent error signals corresponding to the deviation of motor velocity from the frequency of pulses applied to the input and said filter includes means for extracting the error signals, and wherein said phase controller includes means for varying the phases of the input pulses in response to the output of the filter in a direction to decrease the error signals.

3. A motor control system, responsive to external pulses, comprising:
    a driver having an input and for producing current in the motor in response to pulses applied to the input, and for producing electrical values in response to currents applied to the motor;
    a band pass filter;
    a frequency adaptive phase controller; and
    circuit means connecting said filter to said driver for extracting signals over a predetermined frequency range from the electrical values and connecting said phase controller to the input and the filter so that said phase controller varies the phases of pulses applied to the driver in response to the filter;
    the electrical values representing error signals corresponding to the deviation of motor velocity from the frequency of pulses applied to the input and said filter includes means for extracting the error signals, and wherein said phase controller includes means for varying the phases of the input pulses in response to the output of the filter in a direction to decrease the error signals;
    said means for varying the phase of said phase controller including a comparator for comparing the output of the filter with a voltage depending upon the phase and number of cycles of input singals.

4. A device as in claim 3, wherein said comparator includes ramping generating means for producing a ramping voltage responsive to each input pulse and applying said voltage to said comparator so as to produce an output in a direction to decrease the error signals.

5. A device as in claim 4, wherein said means for varying the phases of said phase controller includes a comparator for comparing the output of the filter with a voltage depending upon the phase and number of cycles of input signals.

6. A device as in claim 3, wherein said comparator includes ramping generator means for producing a ramping voltage responsive to each input pulse and applying said voltage to said comparator so as to produce an output when the ramping generator produces a signal having a predetermined relationship with the output of the filter.

7. A device as in claim 6, wherein said ramping generator means includes a capacitor and charging means for charging the capacitor along a ramp voltage at a rate proportional to the frequency of input pulses.

8. A device as in claim 7, wherein said ramping generator means includes reset means for resetting the charging means in response to each pulse produced at the output of said phase controller.

9. A device as in claim 8, wherein said phase controller includes a flip-flop responsive to input signals to produce a first step in response to an input signal appearing at said input of said driver and a second step in response to the output of said filter reaching a given relationship with said ramp voltage in said capacitor.

10. A compensator for a motor driver which drives current through the coils of a motor in response to input pulses applied to the input of the driver, comprising:
    a band pass filter, a frequency adaptive phase controller, circuit menas for connecting said band pass filter to the driver so said filter produces signals over a predetermined frequency range from electrical values produced by currents in the motor and for connecting the phase controller to the driver input and the filter so as to change the phase of the signals applied to the driver in response to the signals from the filter;
    first current sensing means for sensing a first current in the coils of the motor and producing a first current signal, second current sensing means for sensing a second current in the coils of the motor and producing a second current signal, summing means for summing said first current signal and the second current signal to produce a sum signal; and said circuit means including passive means for passively connecting said summing means to said filter so as to supply the sum signal directly to the filter.

11. A compensator for a motor driver which drives current through the coils of a motor in response to input pulses applied to the input of the driver, comprising:
    a band pass filter, a frequency adaptive phase controller, circuit means for connecting said band pass filter to the drive so as filter produces signals over a predetermined frequency range from electrical values produced by currents in the motor and for connecting the phase controller to the driver input and the filter so as to change the phase of the signals applied to the driver in response to the signals from the filter;

the electrical values produced by the currents in the motor representing error signals corresponding to the deviation of motor velocity from the frequency of pulses applied to the input and said filter includes means for extracting the error signals, and wherein said phase controller includes means for varying the phases of the input pulses in response to the output of the filter in a direction to decrease the error signals.

12. A device as in claim 11, wherein said means for varying the phase of said phase controller includes a comparator for comparing the output of the filter with a voltage depending upon the phase and cycles of input signals.

13. A device as in claim 12, wherein said phase comparator includes ramping generating means for producing a ramping voltage responsive to each input pulse and applying said voltage to said comparator so as to produce an output in a direction to decrease the error signals.

14. A device as in claim 13, wherein said means for varying the phase of said phase controller includes a comparator for comparing the output of the filter with a voltage depending upon the phase and number of cycles of input signals.

15. A device as in claim 14, wherein said phase comparator includes ramping generator means for producing a ramping voltage responsive to each input pulse and applying said voltage to said comparator so as to produce an output when the ramping generator produces a signal having a predetermined relationship with the output of the filter.

16. A device as in claim 15, wherein said ramping generator includes a capacitor and charging means for charging the capacitor at a rate proportional to the frequency of input pulses.

17. A device as in claim 16, wherein said ramping generator includes reset means for resetting the charging means in response to each pulse produced at the output of said phase controller.

18. A device as in claim 17, wherein said phase controller includes a flip-flop responsive to input signals to produce a first step in response to an input signal from the input of the driver and a second step in response to the error signal reaching a given relationship with said ramp voltage in said capacitor.

19. A motor control system, responsive to external pulses, comprising:
a driver having an input and for producing current in the motor in response to pulses applied to the input, and for producing electrical values in response to currents applied to the motor;
a band pass filter;
a frequency adaptive phase controller; and
circuit means connecting said filter to said driver for extracting signals over a predetermined frequency range from the electrical values and connecting said phase controller to the input and the filter so that said phase controller varies the phases of pulses applied to the driver in response to the filter;
said driver including first current sensing means for sensing a first current in the motor and producing a first current signal, and second current sensing means for sensing a second current in the motor for producing a second current signal, summing means for summing the first and second current signals to produce a sum signal;
said circuit means including passive means for passively connecting said summing means to said filter so as to supply the sum signal directly to said filter.

20. A compensator for a motor driver which drives current through the coils of a motor in response to input pulses applied to the input of the driver, comprising:
a band pass filter, a frequency adaptive phase controller, circuit means for connecting said band pass filter to the driver so said filter produces signals over a predetermined frequency range from electrical values produced by currents in the motor and for connecting the phase controller to the driver input and the filter so as to change the phase of the signals applied to the driver in response to the signals from the filter;
said phase controller being a phase angle modulator having an output whose phase angle varies with the signals extracted from the filter independent of frequency.

* * * * *